(12) United States Patent
Shin

(10) Patent No.: US 7,554,647 B2
(45) Date of Patent: Jun. 30, 2009

(54) LIQUID CRYSTAL DISPLAY DEVICE AND METHOD FOR MANUFACTURING THE SAME

(75) Inventor: Dong Su Shin, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 229 days.

(21) Appl. No.: 11/642,882

(22) Filed: Dec. 21, 2006

(65) Prior Publication Data

US 2008/0094564 A1 Apr. 24, 2008

(30) Foreign Application Priority Data

May 15, 2006 (KR) .................. 10-2006-0043310

(51) Int. Cl.
*G02F 1/13* (2006.01)
(52) U.S. Cl. .................... 349/189; 349/190
(58) Field of Classification Search ............. 349/187, 349/189, 190
See application file for complete search history.

(56) References Cited

U.S. PATENT DOCUMENTS 6,275,279 B1 * 8/2001 Asuma et al. ............ 349/153
6,811,458 B2 11/2004 Kouva

FOREIGN PATENT DOCUMENTS

JP 05-005892 1/1993

* cited by examiner

*Primary Examiner*—Kevin S Wood
(74) *Attorney, Agent, or Firm*—McKenna Long & Aldridge LLP

(57) ABSTRACT

A method for fabricating a liquid crystal display (LCD) device includes: preparing a liquid crystal cell including a first substrate, a second substrate, liquid crystal between the first and second substrates, and a sealant surrounding the liquid crystal; forming an inlet in the liquid crystal cell while applying a first pressure to the liquid crystal cell; controlling an amount of the liquid crystal using the inlet; and sealing the inlet.

18 Claims, 7 Drawing Sheets

LIQUID CRYSTAL DISPLAY DEVICE AND METHOD FOR MANUFACTURING THE SAME

This application claims the benefit of the Korean Patent Application No. P2006-43310, filed on May 15, 2006, which is hereby incorporated by reference as if fully set forth herein.

BACKGROUND OF THE INVENTION

1. Field of the Invention

The present invention relates to a liquid crystal display (LCD) device and method for fabricating the same, and more particularly, to a method for regulating the amount of liquid crystal in an LCD device.

2. Discussion of the Related Art

Among flat panel display devices, liquid crystal display (LCD) devices have been generally used in notebook computers, monitors, spacecraft, airplanes, etc., due to their advantages such as low power consumption and portability.

Hereinafter, an LCD device according to the related art will be explained with reference to the accompanying drawings. FIG. 1 is a cross-sectional view illustrating an LCD device according to the related art.

Referring to FIG. 1, the LCD device includes lower and upper substrates 10 and 20 facing each other with a predetermined gap therebetween, and a liquid crystal layer 40 between the lower and upper substrates 10 and 20 and sealed by a sealant 30.

Although not shown, the lower substrate 10 includes gate and data lines crossing each other to define a pixel region, a thin film transistor as a switching element formed adjacent to a crossing of the gate and data lines, and a pixel electrode connected to the thin film transistor and formed in the pixel region.

Although not shown, the upper substrate 20 includes a light-shielding layer to prevent a light leakage in areas except the pixel region, a color filter layer of red (R), green (G) and blue (B) in the area corresponding to the pixel region to display colors images, and a common electrode on the color filter layer.

The LCD device is manufactured by preparing the lower and upper substrates and forming a liquid crystal layer between the prepared lower and upper substrates. The liquid crystal layer may be formed by an injection method or dispensing method.

For the injection method, a sealant having an inlet is formed on any one of the lower and upper substrates, and the lower and upper substrates are bonded to each other. Then, liquid crystal is injected into a space between the lower and upper substrates through the inlet.

For the dispensing method, a sealant without an inlet is formed on any one of the lower and upper substrates, and liquid crystal is dispensed on any one of the lower and upper substrates. Then, the lower and upper substrates are bonded to each other.

The injection method is disadvantageous for large-size LCD devices in that it takes a long time to inject liquid crystal between the two large substrates. Accordingly, the dispensing method is generally used to fabricate large-size LCD devices.

In the injection method, it is not required to determine an amount of liquid crystal to be injected because liquid crystal is injected into the space between the two substrates after bonding the two substrates to each other. On the other hand, it is important to determine an appropriate amount of liquid crystal to be dispensed, because the two substrates are bonded to each other after dispensing liquid crystal onto any one of the two substrates in the dispensing method.

The amount of liquid crystal to be dispensed is currently determined based upon the size and height of the LCD panel. However, it is difficult to determine the precise amount of liquid crystal due to various conditions. An insufficient amount of liquid crystal generates unfilled regions in the LCD panel, while an excess amount of liquid crystal generates overfilled regions, thereby degrading the picture quality. The LCD panels having these unfilled or overfilled regions may be discarded, thereby decreasing yield and increasing costs.

SUMMARY OF THE INVENTION

Accordingly, the present invention is directed to a liquid crystal display (LCD) device and method for fabricating the same, which substantially obviates one or more problems due to limitations and disadvantages of the related art.

An advantage of the present invention is to provide an LCD device and method for fabricating the same that can minimize or prevent an unfilled or overfilled region of an LCD panel by controlling an amount of liquid crystal in the LCD panel.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these other advantages and in accordance with the purpose of the invention, as embodied and broadly described herein, a method for fabricating an LCD device includes: preparing a liquid crystal cell including a first substrate, a second substrate, liquid crystal between the first and second substrates, and a sealant surrounding the liquid crystal; forming an inlet in the liquid crystal cell while applying a first pressure to the liquid crystal cell; controlling an amount of the liquid crystal in the liquid crystal cell using the inlet; and sealing the inlet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a liquid crystal display (LCD) device and method for fabricating the same according to the present invention will be explained with reference to the accompanying drawings.

First Embodiment

FIGS. 2A to 2D are plan views illustrating a method for fabricating an LCD device according to the first embodiment of the present invention.

Figure 1:
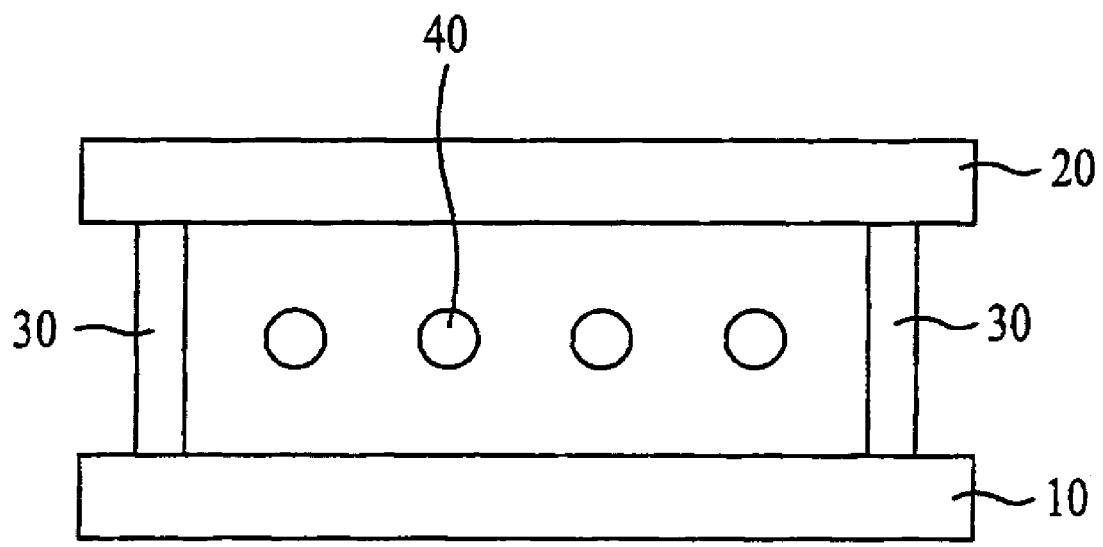
FIG. 1 is a cross-sectional view illustrating a liquid crystal display (LCD) device according to the related art.
Figure 2A:
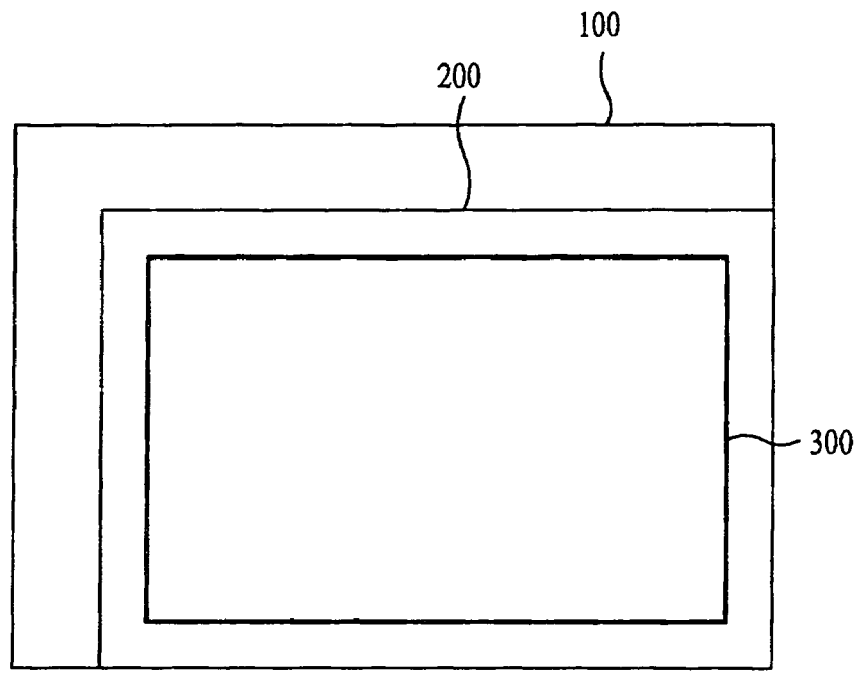
FIGS. 2A to 2D are plan views illustrating a method for fabricating an LCD device according to the first embodiment of the present invention.

Referring to FIG. 2A, a liquid crystal cell is prepared. The liquid crystal cell includes a first substrate 100, a second substrate 200, a liquid crystal layer (not shown) formed between the first and second substrates 100 and 200, and a sealant 300 that surrounds the liquid crystal layer.

The liquid crystal cell is fabricated by preparing the first substrate 100, preparing the second substrate 200 and forming the liquid crystal layer surrounded and sealed by the sealant 300 between the first and second substrates 100 and 200.

Although not shown, the first substrate 100 is prepared by forming gate and data lines crossing each other to define a unit pixel region on a transparent substrate, forming a thin film transistor adjacent to a crossing of the gate and data lines, wherein the thin film transistor functions as a switching element, and forming a pixel electrode in the pixel region, wherein the pixel electrode is electrically connected with the thin film transistor.

Although not shown, the second substrate 200 is prepared by forming a light-shielding layer on a transparent substrate so as to prevent a light leakage, forming a color filter layer between each light-shielding layer and forming a common electrode on the color filter layer. For an In-Plane Switching (IPS) mode LCD device, the common electrode is formed on the first substrate in parallel to the pixel electrode.

The liquid crystal layer between the first and second substrates 100 and 200 is formed by a liquid crystal dispensing method. That is, the sealant 300 is formed on any one of the first and second substrates 100 and 200, and a predetermined amount of liquid crystal is dispensed on one of the first and second substrates 100 and 200, and then the two substrates 100 and 200 are bonded to each other.

After bonding the first and second substrates 100 and 200, it is determined whether an amount of liquid crystal provided in the liquid crystal cell is excessive or insufficient. This inspection may be performed by methods generally known to those skilled in the art.

Figure 2B:
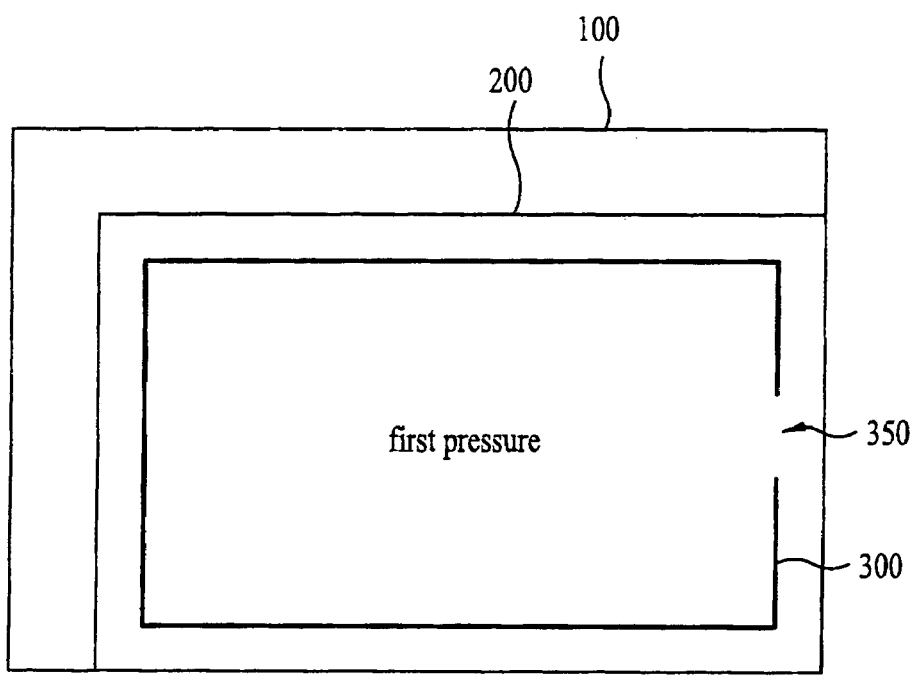

Referring to FIG. 2B, when liquid crystal is excessively or insufficiently provided in the liquid crystal cell, a first pressure is applied to the liquid crystal cell to form an inlet 350 in the sealant 300. An atmospheric pressure may be applied to the liquid crystal cell after positioning the liquid crystal cell in a chamber or pressurizing apparatus.

The inlet 350 in the sealant 300 may be formed by a laser-irradiation method in which a predetermined portion of the sealant 300 is removed by a laser. The inlet 350 may be formed in a shape of an opening by removing the entire width of a predetermined portion of the sealant 300, or may be formed in a shape of a thin film by partially removing the width of the predetermined portion of the sealant 300.

Figure 3A:
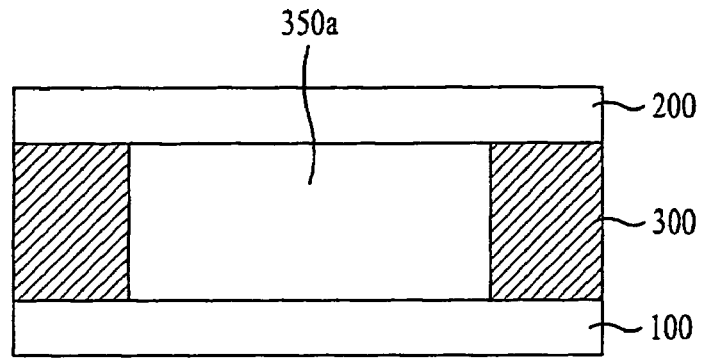
FIGS. 3A to 3C are schematic views illustrating various-shaped inlets according to the first embodiment of the present invention.
Figure 3B:
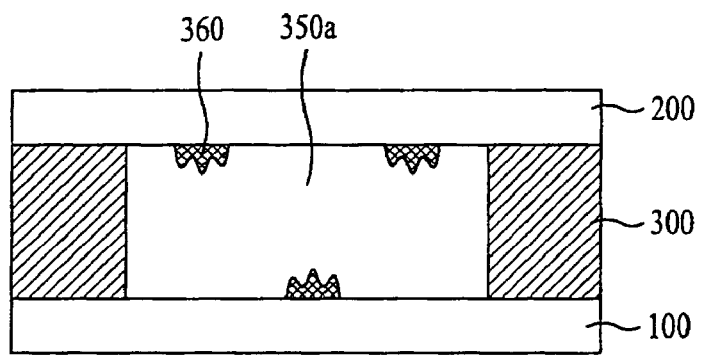
Figure 3C:
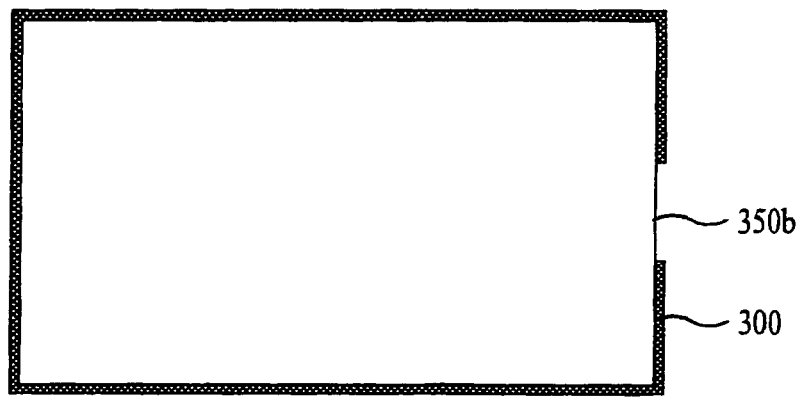

FIGS. 3A to 3C are schematic views illustrating various-shaped inlets according to the first embodiment of the present invention.

FIGS. 3A and 3B illustrate the inlet 350*a* having a shape of an opening 350*a*. The opening 350*a* is formed by completely removing a predetermined portion of the sealant 300. FIG. 3B further illustrates remains of sealant 360 on the first and second substrates 100 and 200. FIG. 3C illustrates the inlet 350*a* having a shape of a thin film 305*b*. A width of the thin film 305*b* is formed within a range between about 0.25 mm and about 0.6 mm and the thin film 305*b* is popped open by pressing out the liquid crystal provided in the liquid crystal cell during the pressurizing process.

Because the first pressure is applied to the liquid crystal cell when forming the inlet 350, it is possible to minimize the remains of the sealant 360 from flowing into the liquid crystal cell. Also, when the inlet 350 is formed in a shape of the thin film 305*b*, it is possible to further minimize or prevent the remains of the sealant 360 from flowing into the liquid crystal cell.

Figure 2C:
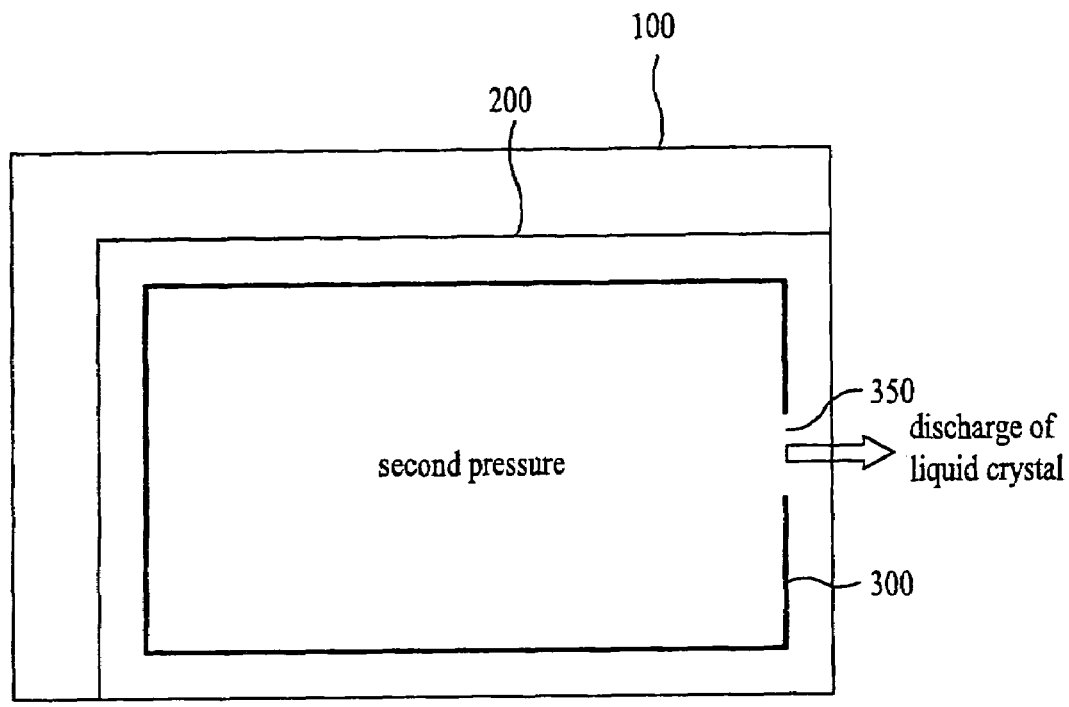

Referring to FIG. 2C, a second pressure is then applied to the liquid crystal cell to discharge an excess amount of the liquid crystal in the liquid crystal cell to the outside through the inlet 350. An amount of liquid crystal discharged through the inlet 350 varies based on an amount of the second pressure and time applied to the liquid crystal cell. Thus, an appropriate pressure and time is determined based on the excess amount of liquid crystal determined during the inspection process.

The second pressure may be the same as the first pressure that is applied to the liquid crystal cell when forming the inlet 350. It is possible to discharge an excess amount of liquid crystal to the outside and to prevent the remains of the sealant 300 from flowing into the liquid crystal cell without changing the pressure applied to the liquid crystal cell.

The second pressure may be higher or lower than the first pressure. When the inlet 350 is formed in a shape of the thin film 350*b*, the second pressure higher than the first pressure is applied to the liquid crystal cell. The thin film 350*b* is popped open under the second pressure so that an excess amount of liquid crystal is discharged to the outside of the liquid crystal cell.

When an insufficient amount of liquid crystal is provided in the liquid crystal cell, a predetermined amount of liquid crystal is additionally supplied into the liquid crystal cell through the inlet 350. In this case, the inlet 350 has a shape of the opening 350*a*, as shown in FIGS. 3A and 3B.

Figure 2D:
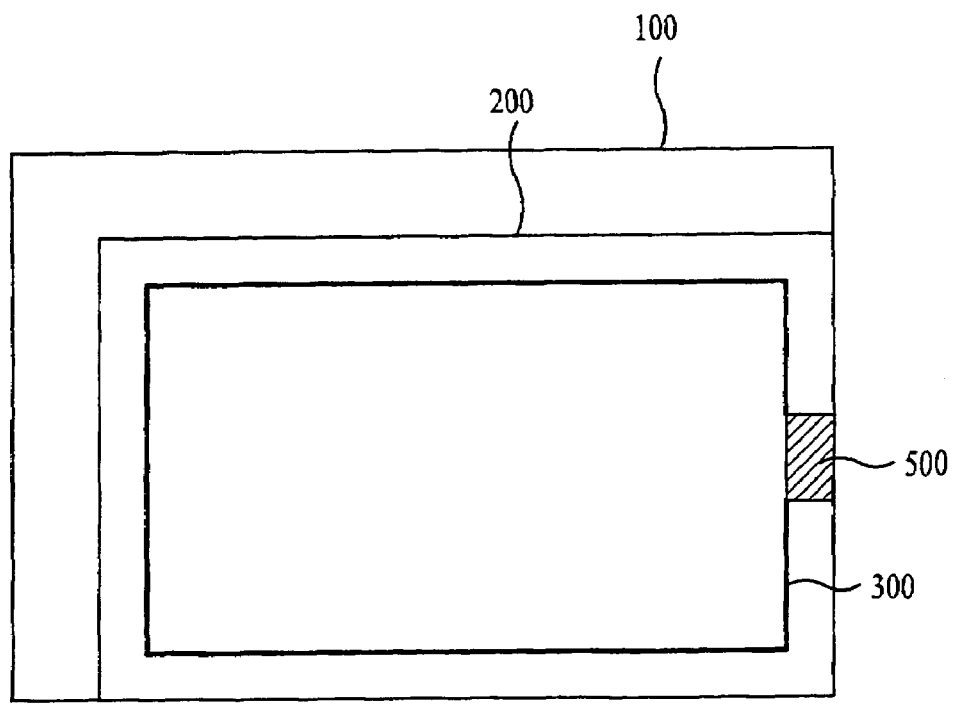

Referring to FIG. 2D, after supplying liquid crystal into the liquid crystal cell, the inlet 350 is sealed with a finish 500 and hardened. The finish 500 may be formed of either a thermal-curing resin or a UV-curing resin. A heat or UV ray is applied to the finish 500 to harden it.

Second Embodiment

FIGS. 4A to 4D are cross-sectional views illustrating a method for fabricating an LCD device according to the second embodiment of the present invention.

Figure 4A:
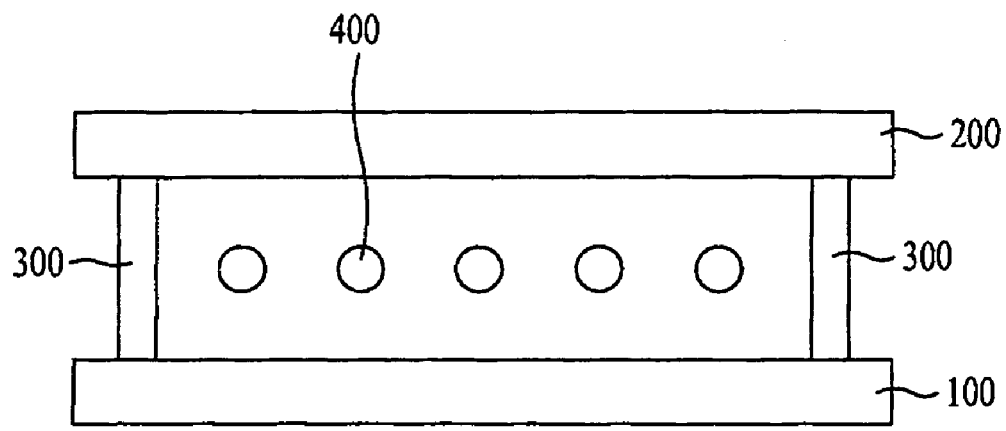
FIGS. 4A to 4D are cross-sectional views illustrating a method for fabricating an LCD device according to the second embodiment of the present invention.

Referring to FIG. 4A, a liquid crystal cell is prepared. The liquid crystal cell includes a first substrate 100, a second substrate 200, a liquid crystal layer (not shown) formed between the first and second substrates 100 and 200, and a sealant 300 that surrounds the liquid crystal layer.

The liquid crystal cell is fabricated by preparing the first substrate 100, preparing the second substrate 200 and forming the liquid crystal layer surrounded and sealed by the sealant 300 between the first and second substrates 100 and 200. Because the process steps for forming the first and second substrates according to the second embodiment are substantially identical to those of the first embodiment, a detailed explanation thereof will be omitted.

After dispensing liquid crystal and bonding the first and second substrates 100 and 200, it is determined whether an amount of liquid crystal provided in the liquid crystal cell is excessive or insufficient.

Figure 4B:
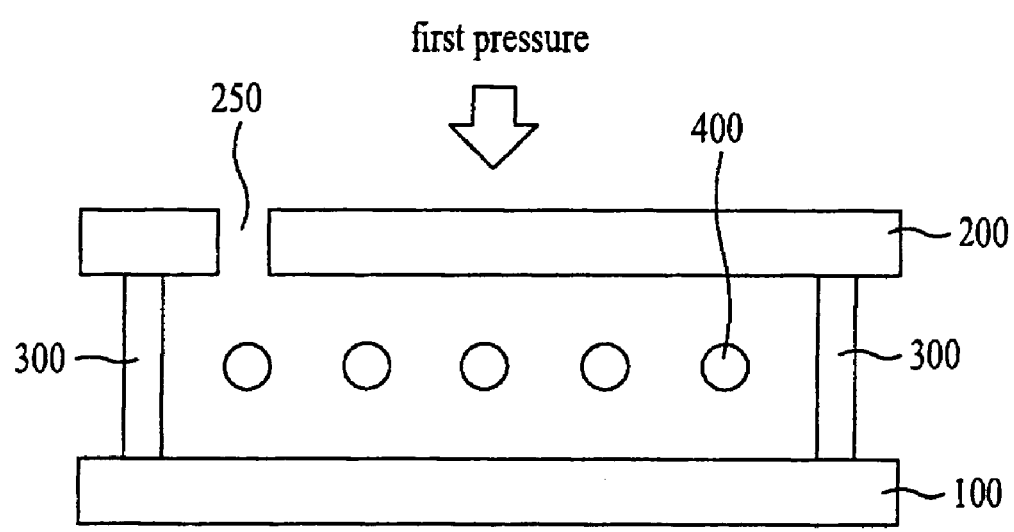

Referring to FIG. 4B, when liquid crystal is excessively or insufficiently provided in the liquid crystal cell, a first pressure is applied to the liquid crystal cell to form an inlet 250 in the second substrate 200. An atmospheric pressure may be applied to the liquid crystal cell after positioning the liquid crystal cell in a chamber or pressurizing apparatus.

The inlet 250 is formed in a shape of a hole by removing a predetermined portion of the second substrate 200. The hole-shaped inlet 250 may be formed by a drill, an ultrasonic generator, a laser irradiator, or the like. Although a single inlet 250 is formed in the second substrate 200 in FIG. 4B, a plurality of inlets 250 may be formed in at least one of the first and second substrates 100 and 200. The hole-shaped inlet 250 is beneficially formed in a dummy region outside the display region of the liquid crystal cell.

The inlet 250 is formed in the second substrate 200 when the first pressure is applied to the liquid crystal cell. Thus, it is possible to minimize or prevent remains of the second substrate 200, which may be generated during the formation of the inlet 250, from flowing into the liquid crystal cell.

Figure 4C:
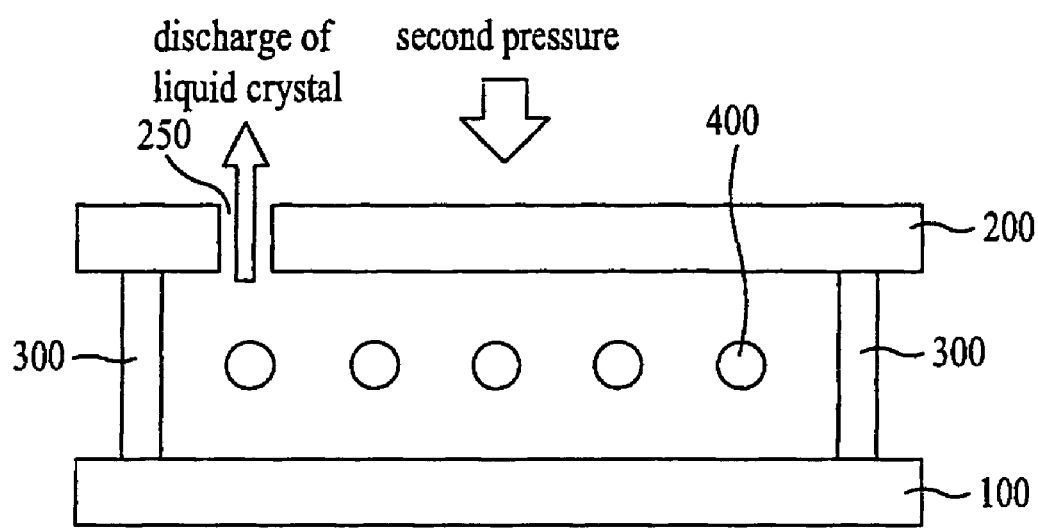

Referring to FIG. 4C, a second pressure is then applied to the liquid crystal cell to discharge an excess amount of the liquid crystal to the outside of the liquid crystal cell through the inlet 250. The second pressure may be the same or different from the first pressure applied in FIG. 4B.

When an insufficient amount of liquid crystal is provided in the liquid crystal cell, a predetermined amount of liquid crystal is additionally supplied into the liquid crystal cell through the inlet 250.

Figure 4D:
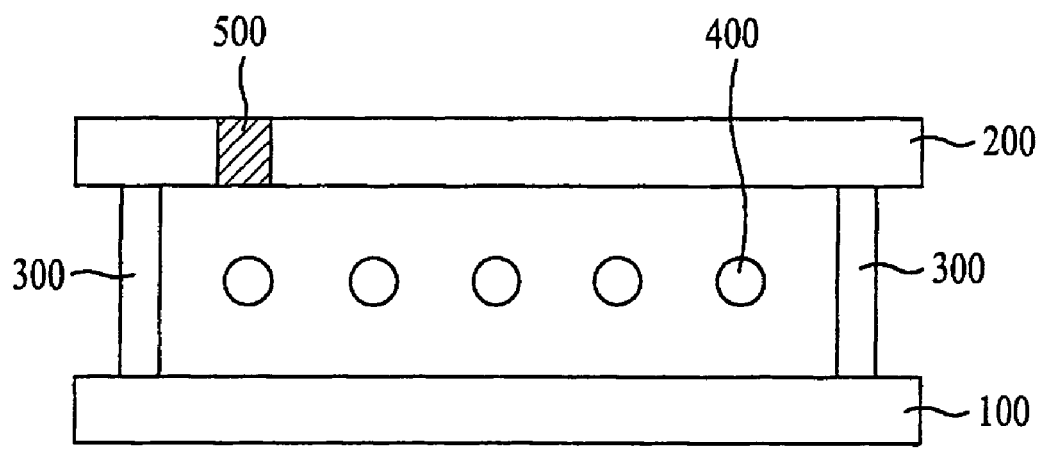

Referring to FIG. 4D, after supplying liquid crystal into the liquid crystal cell, the inlet 250 is sealed with a finish 500 and hardened.

Third Embodiment

Figure 5:
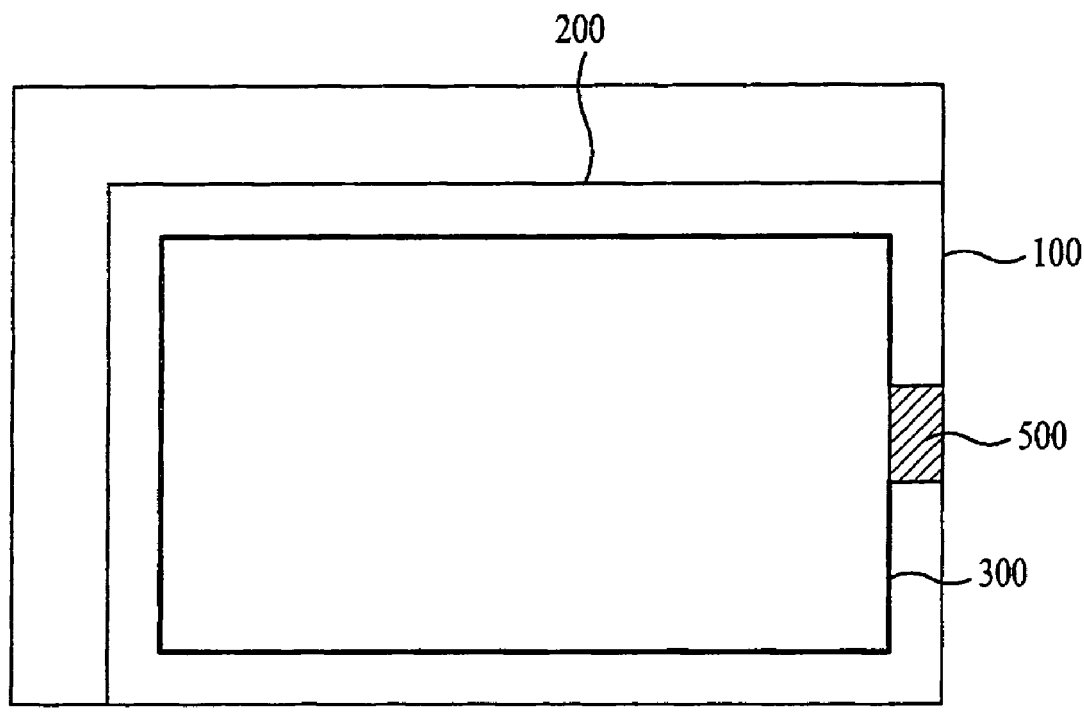
FIG. 5 is a plan view illustrating an LCD device according to the third embodiment of the present invention.

FIG. 5 is a plan view illustrating an LCD device according to the third embodiment of the present invention, wherein the LCD device is manufactured by a method illustrated in FIGS. 2A to 2D according to the first embodiment of the present invention. Thus, the LCD device according to the third embodiment of the present invention may be fully understood with reference to the first embodiment of the present invention.

Referring to FIG. 5, the LCD device according to the third embodiment of the present invention includes a first substrate 100, a second substrate 200, a liquid crystal layer (not shown) formed between the first and second substrates 100 and 200, a sealant 300 that surrounds the liquid crystal layer, an inlet 350 formed in a predetermined portion of the sealant 300, and a finish 500 that seals the inlet 350. Because the structures of the first and second substrates 100 and 200 are identical to the above-mentioned substrates, a detailed explanation thereof will be omitted.

The inlet 350 may be formed in a shape of an opening by removing the entire width of a predetermined portion of the sealant 300 or may be formed in a shape of a thin film by partially removing the width of the predetermined portion of the sealant 300.

The finish 500 may be formed of a UV-curing resin or a thermal-curing resin. Also, the finish 500 may be formed of the same material as the sealant 300.

Fourth Embodiment

Figure 6:
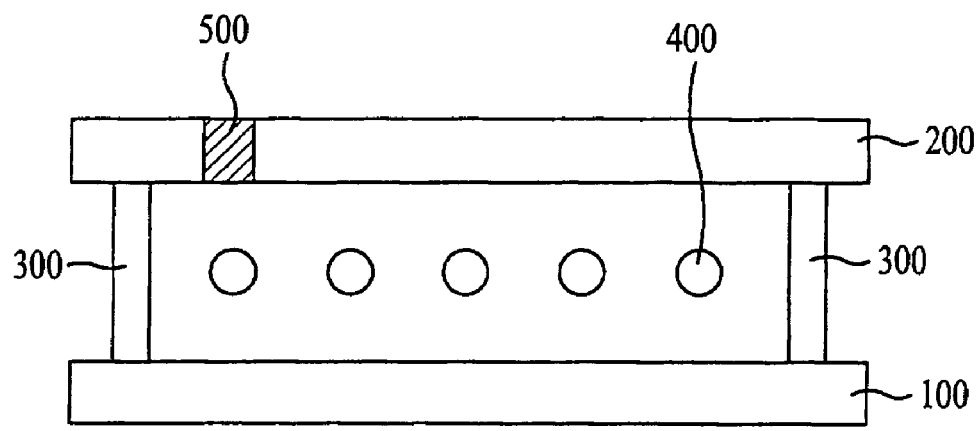
FIG. 6 is a cross-sectional view illustrating an LCD device according to the fourth embodiment of the present invention.

FIG. 6 is a cross-sectional view illustrating an LCD device according to the fourth embodiment of the present invention, wherein the LCD device is manufactured by a method illustrated in FIGS. 4A to 4D according to the first embodiment of the present invention. Thus, the LCD device according to the forth embodiment of the present invention may be fully understood with reference to the second embodiment of the present invention.

Referring to FIG. 6, the LCD device according to the fourth embodiment of the present invention includes a first substrate 100, a second substrate 200, a liquid crystal layer (not shown) formed between the first and second substrates 100 and 200, a sealant 300 that surrounds the liquid crystal layer between the first and second substrates 100 and 200, an inlet 250 which is formed in a predetermined portion of the substrate 200, and a finish 500 that seals the inlet 350.

The inlet 250 having a shape of a hole is formed in the predetermined portion of the second substrate 200. The hole-shaped inlet 250 is formed in at least one of the first and second substrates 100 and 200. The hole-shaped inlet 250 is beneficially formed in a dummy region outside the display region of the liquid crystal cell.

The finish 500 may be formed of a UV-curing resin or a thermal-curing resin. Also, the finish 500 may be formed of the same material as the sealant 300.

As described above, an LCD device and method for fabricating the same according to the present invention has the following advantages. First, when an excessive or insufficient amount of liquid crystal is provided in the liquid crystal cell, the excess amount of liquid crystal may be discharged to the outside of the liquid crystal cell or the insufficient amount of liquid crystal may be additionally supplied into the liquid crystal cell through the inlet. Also, because the inlet is formed when the first pressure is applied to the liquid crystal cell, it is possible to minimize or prevent the remains of the sealant or substrate from flowing into the liquid crystal cell.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) device, the method comprising:
    preparing a liquid crystal cell including a first substrate, a second substrate, liquid crystal between the first and second substrates, and a sealant surrounding the liquid crystal as a shape of closed-loop, wherein preparing the liquid crystal cell includes:
    preparing the first and second substrates;
    forming the sealant on any one of the first and second substrates;
    dispensing a predetermined amount of liquid crystal on any one of the first and second substrates; and
    bonding the first and second substrates to each other;

forming an inlet in the sealant while applying a first pressure to the liquid crystal cell, after preparing the liquid crystal cell;

controlling an amount of the liquid crystal in the liquid crystal cell using the inlet; and sealing the inlet.

2. The method of claim 1, wherein the first pressure applied to the liquid crystal cell is an atmospheric pressure.

3. The method of claim 1, wherein the inlet is formed by removing a predetermined portion of the sealant.

4. The method of claim 3, wherein removing the predetermined portion of the sealant uses a laser irradiation method.

5. The method of claim 3, wherein the inlet is an opening formed by completely removing an entire width of the predetermined portion of the sealant.

6. The method of claim 3, wherein the inlet is formed in a shape of a thin film by partially removing the predetermined portion of the sealant.

7. The method of claim 6, wherein a width of the thin film is such that the thin film is popped open when controlling the amount of the liquid crystal.

8. The method of claim 7, wherein the width of the thin film is between about 0.25 mm and about 0.6 mm.

9. The method of claim 1, wherein the inlet is a hole formed in any one of the first and second substrates.

10. The method of claim 9, wherein the hole is formed in a dummy region outside a display region of the liquid crystal cell.

11. The method of claim 9, wherein the hole is formed by one of a drill, a supersonic generator, and a laser irradiator.

12. The method of claim 1, wherein controlling the amount of the liquid crystal is includes discharging an excess amount of the liquid crystal to the outside of the liquid crystal cell.

13. The method of claim 12, wherein discharging the excess amount of the liquid crystal is performed while applying a second pressure to the liquid crystal cell.

14. The method of claim 13, wherein the second pressure is substantially identical to the first pressure.

15. The method of claim 13, wherein the second pressure is higher than the first pressure.

16. The method of claim 1, wherein controlling the amount of the liquid crystal is includes supplying a predetermined amount of the liquid crystal into the liquid crystal cell through the inlet.

17. The method of claim 1, wherein sealing the inlet includes providing a finish in the inlet and hardening the finish.

18. The method of claim 1, further comprising:
 determining an amount of the liquid crystal provided in the liquid crystal cell.

\* \* \* \* \*